United States Patent
Afzal

(10) Patent No.: US 12,445,473 B2
(45) Date of Patent: Oct. 14, 2025

(54) SYSTEMS AND METHODS FOR TRIANGULAR TIMESTAMP TRANSFORMATION IN COMPUTER MESSAGING

(71) Applicant: MASTERCARD INTERNATIONAL INCORPORATED, Purchase, NY (US)

(72) Inventor: Sayed Amin Afzal, Chesterfield, MO (US)

(73) Assignee: MASTERCARD INTERNATIONAL INCORPORATED PURCHASE, Purchase, NY (US)

( * ) Notice: Subject to any disclaimer, the term of this patent is extended or adjusted under 35 U.S.C. 154(b) by 332 days.

(21) Appl. No.: 18/163,110

(22) Filed: Feb. 1, 2023

(65) Prior Publication Data
US 2024/0259410 A1    Aug. 1, 2024

(51) Int. Cl.
*G06F 16/25*    (2019.01)
*H04L 9/40*    (2022.01)
*G06F 18/10*    (2023.01)

(52) U.S. Cl.
CPC ........ *H04L 63/1425* (2013.01); *G06F 16/258* (2019.01); *H04L 63/1416* (2013.01); *G06F 18/10* (2023.01)

(58) Field of Classification Search
CPC .................................................. G06F 16/258
USPC ......................................................... 707/636
See application file for complete search history.

(56) References Cited

U.S. PATENT DOCUMENTS

| | | | |
|---|---|---|---|
| 6,192,281 B1 | 2/2001 | Brown | |
| 6,456,845 B1 | 9/2002 | Drum | |
| 9,197,652 B2 | 11/2015 | Busser | |
| 9,370,722 B2 | 6/2016 | Ocko | |
| 2006/0265397 A1* | 11/2006 | Bryan | ........ G06N 5/02 |
| 2011/0106890 A1 | 5/2011 | Karpov et al. | |

(Continued)

FOREIGN PATENT DOCUMENTS

| | | | |
|---|---|---|---|
| CN | 108075941 | 5/2018 | |
| CN | 112639990 A * | 4/2021 | ........ A61B 5/0004 |
| KR | 100912972 B1 | 8/2009 | |

OTHER PUBLICATIONS

PCT International Search Report and Written Opinion, Application No. PCT/US2024/010644, dated May 7, 2024, 8 pps.

*Primary Examiner* — Syling Yen
(74) *Attorney, Agent, or Firm* — Armstrong Teasdale LLP

(57) ABSTRACT

A message traffic analysis system is provided. The message traffic analysis system includes a memory device and at least one processor. The at least one processor is programmed to receive a plurality of historical messages between a plurality of sources and a destination server, for each of the plurality of historical messages, time shift the corresponding timestamp by an amount, transform the plurality of time shifted timestamps based on a portion of an entire time period completed, generate a model of message traffic based on the plurality of historical messages with the transformed and time shifted timestamps, receive one or more real-time messages between a first source and the destination server, execute the model of message traffic using the one or more real-time messages as inputs, and determine whether or not to allow the one or more real-time messages based on the execution of the model.

20 Claims, 15 Drawing Sheets

(56) References Cited

U.S. PATENT DOCUMENTS

| | | | |
|---|---|---|---|
| 2012/0254596 A1 | 10/2012 | Yang et al. | |
| 2014/0344622 A1* | 11/2014 | Huang | G06F 11/0775 |
| | | | 714/37 |
| 2020/0145430 A1 | 5/2020 | Vallur | |
| 2021/0312452 A1 | 10/2021 | Allbright | |
| 2021/0406112 A1* | 12/2021 | Moss | G06F 11/0751 |
| 2022/0368708 A1 | 11/2022 | Maeda | |

* cited by examiner

SYSTEMS AND METHODS FOR TRIANGULAR TIMESTAMP TRANSFORMATION IN COMPUTER MESSAGING

BACKGROUND

The present application relates generally to triangular timestamp transformation in computer messaging over an electronic network, and more particularly, to computer based systems and methods for managing message traffic in computer networks over global systems.

The time of events are important factors for detecting abnormal behaviors including within message traffic. Normal message traffic patterns oftentimes change based on the time that they occur. What may be normal traffic patterns at one time, may be indicative of abnormal and/or malicious behavior at other periods of time. For example, significant message traffic to a workplace during normal working hours for that business would be considered normal when analyzed by an outside observer, such as a message traffic analyst. However, significant message traffic at 2 o'clock in the morning, when the workplace closed eight hours before, could be considered suspicious. In another example, what is considered normal message traffic on a Tuesday, may be considered suspicious on a Sunday, and vice versa. However, with the International nature of the Internet, some networks may be accessed by individuals from all over the world, where the time zones affect the time associated with different messages. Furthermore, the arbitrary divisions between days, may cause issues when attempting to generate profiles of computer networks to determine when different computer networks should and should not be receiving different levels of message traffic to allow monitoring systems to detect when suspicious behavior may be occurring.

Accordingly, it is desirable to adjust message traffic monitoring systems to account for time differences in international message traffic so that messaging patterns may be more accurately determined and suspicious/fraudulent activities more easily detected.

BRIEF DESCRIPTION

In one aspect, a message traffic analysis system is provided. The message traffic analysis system includes a memory device and at least one processor coupled to the memory device. The at least one processor is programmed to receive a plurality of historical messages between a plurality of sources and a destination server. Each message of the plurality of historical messages includes a timestamp. For each of the plurality of historical messages, the at least one processor is also programmed to time shift the corresponding timestamp by an amount. The at least one processor is further programmed to transform the plurality of time shifted timestamps based on a portion of an entire time period completed. In addition, the at least one processor is programmed to generate a model of message traffic based on the plurality of historical messages with the transformed and time shifted timestamps. Furthermore, the at least one processor is programmed to receive one or more real-time messages between a first source and the destination server. Moreover, the at least one processor is programmed to execute the model of message traffic using the one or more real-time messages as inputs. In addition, the at least one processor is also programmed to determine whether or not to allow the one or more real-time messages based on the execution of the model.

In another aspect, a computer-implemented method for message traffic analysis is provided. The method is implemented on a computing device comprising a memory device coupled to at least one processor. The method includes receiving a plurality of historical messages between a plurality of sources and a destination server. Each message of the plurality of historical messages includes a timestamp. For each of the plurality of historical messages, the method also includes time shifting the corresponding timestamp by an amount. The method further includes transforming the plurality of time shifted timestamps based on a portion of an entire time period completed. In addition, the method includes generating a model of message traffic based on the plurality of historical messages with the transformed and time shifted timestamps. Furthermore, the method includes determining whether or not to allow the one or more real-time messages based on the execution of the model. Moreover, the method includes receiving one or more real-time messages between a first source and the destination server. In addition, the method also includes executing the model of message traffic using the one or more real-time messages as inputs. In addition, the method further includes determining whether or not to allow the one or more real-time messages based on the execution of the model.

In a further aspect, at least one non-transitory computer-readable storage media having computer-executable instructions embodied thereon for authenticating an online user is provided. When executed by at least one processor, the computer-executable instructions cause the at least one processor to receive a plurality of historical messages between a plurality of sources and a destination server. Each message of the plurality of historical messages includes a timestamp. For each of the plurality of historical messages, the computer-executable instructions also cause the at least one processor to time shift the corresponding timestamp by an amount. The computer-executable instructions further cause the at least one processor to transform the plurality of time shifted timestamps based on a portion of an entire time period completed. In addition, the computer-executable instructions cause the at least one processor to generate a model of message traffic based on the plurality of historical messages with the transformed and time shifted timestamps. Furthermore, the computer-executable instructions receive one or more real-time messages between a first source and the destination server. Moreover, the computer-executable instructions cause the at least one processor to execute the model of message traffic using the one or more real-time messages as inputs. In addition, the computer-executable instructions also cause the at least one processor to determine whether or not to allow the one or more real-time messages based on the execution of the model.

BRIEF DESCRIPTION OF THE DRAWINGS

FIGS. 1-13 show example embodiments of the methods and systems described herein.

FIG. 1 is a schematic diagram illustrating an example MTTA platform in communication with a multi-party payment processing system for processing transactions in accordance with one embodiment of the present disclosure.

FIG. 2 is an expanded block diagram of an example embodiment of a computer system used in analyzing message traffic.

FIG. 3 is an expanded block diagram of an example embodiment of a computer system used in analyzing message traffic for transactions.

FIG. 4 illustrates an example configuration of a user computing device.

FIG. 5 illustrates an example configuration of a server system, such as the messaging timestamp transformation analysis (MTTA) platform shown in FIG. 1, in accordance with one example embodiment of the present disclosure.

FIG. 6 illustrates a graph of a timestamp triangular transformation based on hours of a day, in accordance with at least one embodiment.

FIG. 7 illustrates a graph of a timestamp triangular transformation based on days of a month, in accordance with at least one embodiment.

FIG. 9 illustrates another graph of a timestamp triangular transformation based on days of a month, in accordance with at least one embodiment

FIG. 11 illustrates a graph of a timestamp triangular transformation based on days of a week, in accordance with at least one embodiment.

FIG. 13 is a flow diagram of an example process for performing timestamp triangular transformation on message traffic using the MTTA system shown in FIGS. 2 and 3.

Figure 1:
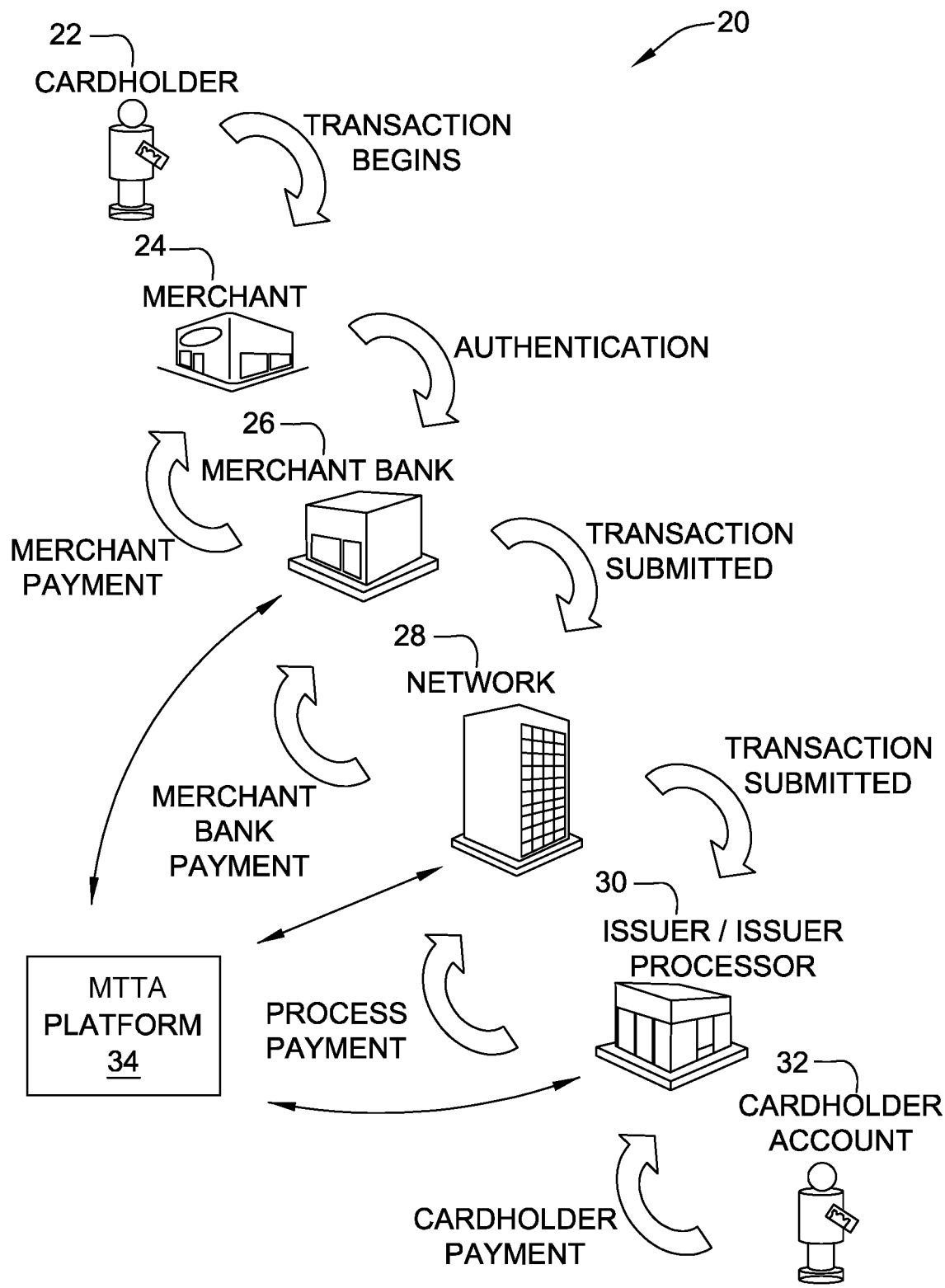

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein relate generally to monitoring message traffic using timestamp triangular transformation to adjust for time-based differences. Message traffic monitoring systems use a plurality of different signals that can be used as input features for their models to improve their performance. Some features help in sensing deviation from the normal pattern of activities with certain entities. The time of events is an important factor. In one example, assume a model that detects massive attacks against merchants. Some merchants are more active during the weekend (or vice versa). Without considering this characteristic, the average of the traffic (expressed as velocities) and the model finds the relationship of the current traffic with the expected traffic. But this detection is based on average (the model does not have a sense of the day of the week). So, the model cannot distinguish the differences in the relative behavior of attacks and the normal traffic for weekend versus weekdays. It makes the model less specific: for this example (a busy merchant during the weekends and quite during the weekdays), the model may miss small attacks during the weekdays and incorrectly catching busy events during the weekends. So, information about the timestamp can help the model for distinguishing these events based on their time of occurrence.

In many situations, the timestamp itself cannot be ingested into models when it is based on a the time passed from a certain anchor (e.g. number of seconds after Jan. 1, 1970). The timestamp does not give any information, for example, about the time of the day. One correction is to simply build some binary fields based on same calculations to flag the time of the day. For example, by some algebra, making 24 new fields that flag the time of the day. In this case, field 13 will be 1 if the time of the day is from 13:00 to 14:00. But this increases the size of the messages and could require significant investments in time and programming to update messages with these fields. Furthermore, from an analysis point of view, these fields will have sharp edges, a/k/a one second can switch the value. This can have negative impacts on a model performance. This disclosure suggests a method for smooth transformation of the time.

In message traffic, especially when dealing with businesses, there are many behaviors and patterns related to the time of day, the day of week, the day of month, the day of the year, etc. In message traffic analysis, one of the goals is to profile the various destination servers, such as merchants, to determine the patterns of behavior for the message traffic to and from those destination servers. For example, there are merchants who are active during the day, but not the night. Others are just active during the weekend and not the weekdays. Viewing these patterns of traffic allow monitoring systems to compare with real-time patterns to detect abnormalities that may be indicative of suspicious behavior. Because of the time-based changes in behavior, it can be difficult for monitoring systems to detect attacks and other suspicious behavior.

Monitoring systems analyze message traffic to and from destination servers to know when those servers are busy, or have busier or larger than normal traffic. This information is integrated into a model of the behavior of the message traffic for each destination server. This model can be used to detect attacks and other suspicious activity. For example, when an attack happens during a weekday, the average overall message traffic for a week might not be exceeded by the attack, but the average for that weekday would be exceeded. If the monitoring system can distinguish busy weekends from individual weekday, the attack may then be more easily detected.

There are several issues that the time-sensitive models need to take into account beyond just weekdays and weekends. The first issue is that time zones can cause issues. For example, if a client system is in Europe, while the destination server, such as a gaming server or transaction processing server, is in the United States, this can cause issues with the time zone differences. Which time zone should the monitoring system use to determine if this message traffic is abnormal? Should the time zone and time from the source or the time zone and time from the destination be used? The local time of the destination server could be used, but that can cause issues, since messages can come in from all over the world. Other issues include, but are not limited to, the daylight savings time in the U.S. versus the summertime in Europe. Accordingly, the timestamp needs a transformation before being used in a model to be consistent. For example, day of the week can be divided into 7 days with one column per day for the analysis.

The second issue is time switch over. For example, if a first message is sent at 11:59 PM and a response or follow-up message is transmitted after 12 AM, the switch over, to potentially the next day, can be missed by some models. A minute or a few seconds can change over the associated values and thus the model does not connect those messages. Accordingly, the model needs to account for these switchovers and have smoother edges, along with some way to compensate for the difference.

In the exemplary embodiment, the models described herein use time-shifting applied to radians where a full time period, such as a 24 hour day, is $2\pi$. The times of the day are in radians and represent the portion of the day that has passed. The models and monitoring systems consider: time unit and time scale (e.g. time of the day). The monitoring system calculates the number of time units t passed from the beginning of the time scale. For example, if the time unit is 1 second and time scale is 1 day, then, for 13:30:40 (number of seconds from the beginning of the day until the current time):

$$t = 13*60*60 + 30*60 + 40 \qquad \text{EQ. 1}$$

The monitoring system calculates the total number of time units in the time scale (number of seconds in a day):

$$T = 24*60*60 \qquad \text{EQ. 2}$$

The monitoring systems may also shift the basis of time. For example, the base point is noon. Then:

$$S = 12*60*60 \qquad \text{EQ. 3}$$

The monitoring system calculates the shifted time relative to the scale:

$$Rt = (t - S)/T \qquad \text{EQ. 4}$$

The monitoring system transforms the relative time to angular space:

$$Wt = Rt*2*Pi \qquad \text{EQ. 5}$$

The monitoring system applies cosine or sine on the angle:

$$Dt = \cos(Wt/2) \text{ or } \sin(Wt/2) \qquad \text{EQ. 6}$$

This can be rewritten as:

$$Dt = \cos(a*Wt) \text{ or } \sin(a*Wt) \qquad \text{EQ. 7}$$

where a is a coefficient. Alternatively, the monitoring system can use hyperbolic tangent:

$$Dt = 1 - \tanh(2*Wt) \qquad \text{EQ. 8}$$

Which can be rewritten as:

$$Dt = c - \tanh(a*Wt) \qquad \text{EQ. 9}$$

In some embodiments, the monitoring system can apply a power the product can adjust the signal further:

$$Pt = Dt^{\wedge} p \qquad \text{EQ. 10}$$

where, p is the power. The monitoring system can use Pt, its velocities, and/or relative values of its velocities to other velocities to be inputs into the models.

Furthermore, the model and/or monitoring systems can have multiple shifts per time scale. For example, three time shifts in a day (8-hour shifts). In this way, each signal is more sensitive to ⅓ of the day.

At least one of the technical problems addressed by this system includes: (i) increased accuracy of modelling of message traffic from international locations: (ii) increased accuracy in modelling of transactions from international locations: (iii) increased accuracy in detecting potential compromise from different locations; and (iv) reduced misclassification of fraudulent transactions.

A technical effect of the systems and processes described herein is achieved by performing at least one of the following steps: a) receive a plurality of historical messages between a plurality of sources for a destination server, wherein each message of the plurality of historical messages includes a timestamp: b) for each of the plurality of historical messages, time shift the corresponding timestamp by an amount: c) transform the plurality of time shifted timestamps based on a portion of an entire time period completed, wherein the entire time period is one of a day, a week, a month, or a year: d) generate a model of message traffic based on the plurality of historical messages with the transformed and time shifted timestamps; e) receive one or more real-time messages between a first source and the destination server: f) execute the model of message traffic using the one or more real-time messages as inputs: g) determine whether or not to allow the one or more real-time messages based on the execution of the model: f) retrieve one or more timestamps associated with the one or more real-time messages: g) time shift and transform the one or more timestamps: h) adjust the one or more real-time messages with the time shifted and transformed one or more timestamps: i) execute the model of message traffic using the one or more adjusted real-time messages at inputs: j) time shift a time or a date of the time stamp by a first amount to create a first shifted timestamp: k) time shift the time or data of the time stamp by a second amount to create a second shifted timestamp: l) time shift the time or data of the time stamp by a third amount to create a third shifted timestamp: m) generate the model using one or more of the first shifted timestamp, the second shifted timestamp, and the third shifted timestamp: n) transform the time shifted timestamp into radians for the portion of the entire time period completed: o) apply a function of cosine or sine to the radians of the timestamp: p) apply a power to results of the function: q) apply a hyperbolic tangent function to the radians of the timestamp: r) receive a second plurality of message traffic, including a second plurality of timestamps: s) for each message of the second plurality of message traffic, time shift the corresponding timestamp by the amount: t) transform the second plurality of time shifted timestamps based on a portion of an entire time period completed: u) update the model of message traffic based on the second plurality of message traffic with the transformed and time shifted timestamps; v) transmit one or more alerts based on the execution of the model, and w) discard the one or more real-time messages based on the execution of the model.

As will be appreciated, based on the description herein the technical improvement in the message monitoring system as described herein is a computer-based solution to a technical deficiency or problem that is itself rooted in computer technology (e.g., the problem itself derives from the use of computer technology). More specifically, malicious attacks on computer system is significant problem for most computer systems, especially those that conduct transactions over an electronic payment network, especially for card-not-present transactions. Unauthorized individuals attempting to access and/or attack computer systems that store important and/or personal data is also significant problem for systems of securing information. Timestamp Triangular Transforming methodologies (e.g., MTTA) are useful to more efficiently process and monitor transactions and messages in an efficient manner and without increasing network traffic and processing load. Accordingly, to address this problem, the systems and methods described herein address this technical problem by using a messaging timestamp transformation analysis (MTTA) server and MTTA engine to transform time information, perform analysis, determine rules, and filter the results based on the rules provided to securely monitor computer networks.

The following detailed description of the embodiments of the disclosure refers to the accompanying drawings. The same reference numbers in different drawings may identify the same or similar elements. Also, the following detailed description does not limit the claims.

Described herein are computer systems such as authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York: Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating an example messaging timestamp transformation analysis (MTTA) platform 34 in communication with a multi-party payment processing system 20 for processing transactions in accordance with one embodiment of the present disclosure. FIG. 1 depicts a flow of data for a financial transaction through system 20. Embodiments described herein may relate to a transaction card system, such as a credit card payment system using the MASTERCARD® interchange network. The MASTERCARD® interchange network is a set of proprietary communications standards promulgated by Mastercard International Incorporated® for the exchange of financial transaction data and the settlement of funds between financial institutions that are members of Mastercard International Incorporated®. (MASTERCARD® is a registered trademark of Mastercard International Incorporated located in Purchase, New York).

In the exemplary transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authentication of the cardholder 22 and authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether the alleged cardholder is actually legitimate cardholder 22 (i.e., authentication), whether cardholder's 22 account 32 is in good standing, and whether the purchase is covered by cardholder's 22 available credit line. Based on these determinations, the requests for authentication and authorization will be declined or accepted. Authentication may be performed prior to authorization. If the requests are accepted, an authorization code is issued to merchant 24.

In the exemplary embodiment, the payment card system 20 includes or is in communication with a messaging timestamp transformation analysis (MTTA) server 34. In this embodiment, the MTTA platform 34 provides enhanced modeling of messages and transaction, where the modeling is enhanced using the timestamp triangulation transformation described herein. The MTTA platform 34 uses historical messages and/or transaction to build one or more models. The models include time shifted and transformed timestamps as described herein. In the exemplary embodiment, the MTTA platform 34 may receive historical data from one or more of the acquirer bank 26, the interchange network 28, and the issuer 30. The historical data may include messages and/or transaction data associated with a plurality of PANs, other historical data associated with the plurality of PANs, etc. The historical data may be associated with both card present and card not present historical transactions. For example, the historical data may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the historical data may be stored in a database accessible by MTTA platform 34 and operated by an interchange network 28. In some embodiments, the historical data will be hashed prior to storing to protect the security of this personally identifiable information.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction may be settled between issuer bank 30 and interchange network 28, and then between interchange network 28 and merchant bank 26, and then between merchant bank 26 and merchant 24.

As described below in more detail, messaging timestamp transformation analysis (MTTA) may be performed by the MTTA platform 34 on behalf of an access control server (ACS) or issuer bank 30 in the context of multi-party payment card system 20. Although the systems described herein are not intended to be limited to facilitate such applications, the systems are described as such for example purposes.

Figure 2:
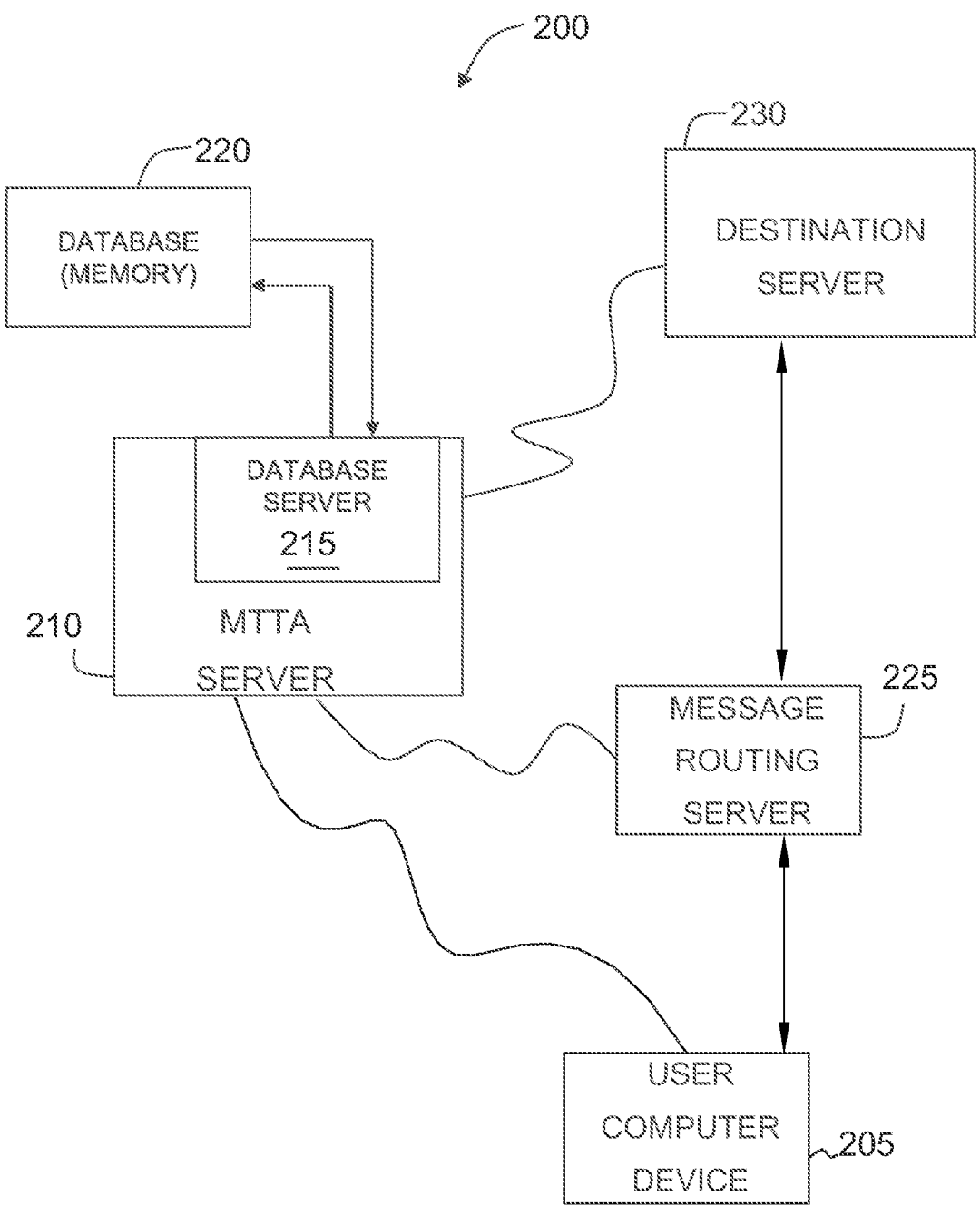

FIG. 2 is an expanded block diagram of an example embodiment of a computer system 200 used in analyzing message traffic. In the exemplary embodiment, system 200 may be used for performing timestamp transformation, and for monitoring and analyzing message traffic. This message traffic may include payment transactions as well as users attempting to access secure information over computer networks.

In the exemplary embodiment, user computer devices 205 are computers that include a web browser or a software application, which enables user computer devices 205 to access remote computer devices, such as destination server 230, using the Internet or other network. More specifically, user computer devices 205 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 205 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, user computer devices 205 are located throughout the world and potentially in different time zones from the destination server 230.

In the exemplary embodiment, message routing server 225 is a gateway or router or other computer system that allows for routing messages from one computer network, such as that of user computer device 205, to another computer network, such as that of destination server 230, using the Internet or other network. More specifically, message routing server 225 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Message routing server 225 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, message routing server 225 may be associated with an Internet service provider, a cellular provider, or other system that provides access to the Internet to either the user computer device 205 or the destination server 230. In some embodiments, messages routed through message routing server 225 may be payment transactions performed through a merchant website 310 (shown in FIG. 3) and are considered card not present transactions. These message may include users attempting to access secure information over computer networks from destination server 230.

In the exemplary embodiment, destination server 230 is a computers that include a web browser or a software application, which enables user computer devices 205 to access one or more services provided by the destination server 230, using the Internet or other network. Examples of destination servers 230 include, but are not limited to, gaming servers, financial institutions, merchant websites 310, Internet of Things (IoT) servers, and/or other servers which provide access to one or more services to user computer devices 205. More specifically, destination servers 230 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Destination servers 230 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiments, message timestamp transformation analysis (MTTA) server 210 monitors the message traffic to and from a destination server 230. In some embodiments, the MTTA server 210 is associated with the destination server 230 and is in communication with the destination server 230. In other embodiments, the MTTA server 210 is in communication with one or more message routing servers 225 associated with the destination server 230. In some embodiments, MTTA server 210 is similar to MTTA platform 34 (shown in FIG. 1). In the exemplary embodiment, MTTA server 210 receives copies of messages from the message routing server 225 and/or the destination server 230 and uses that data to analyze the messages as described further herein. In some embodiments, the MTTA server 210 receives real-time messaging data and detects whether or not there are abnormalities with the messaging data based on the profile of the messaging traffic for the destination server 230.

In the exemplary embodiments, MTTA server 210 is in communication with a plurality of computer devices to collect messaging traffic. In the exemplary embodiment, MTTA servers 210 are computers that include a web browser or a software application, which monitors message traffic between the destination server 230 and a plurality of user computer devices 205, using the Internet or other network. More specifically, MTTA servers 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. MTTA servers 210 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 215 is connected to database 220. In one embodiment, centralized database 220 is stored on the MTTA server 210 and can be accessed by potential users at one of user computing devices 205 by logging onto MTTA server 210 through one or more client systems. In an alternative embodiment, database 220 is stored remotely from MTTA server 210 and may be non-centralized. Database 220 may be a database configured to store information used by MTTA server 210 including, for example, historical message traffic and profiles for different destination servers, including both payment transactions and users attempting to access secure information.

Database 220 may include a single database having separated sections or partitions, or may include multiple databases, each being separate from each other. Database 220 may store message traffic data generated over a computer network, such as the processing system 20 (shown in FIG. 1) including data relating to merchants, consumers, account holders, prospective customers, issuers, acquirers, and/or purchases made. Database 220 may also store message traffic from different periods of time.

Figure 3:
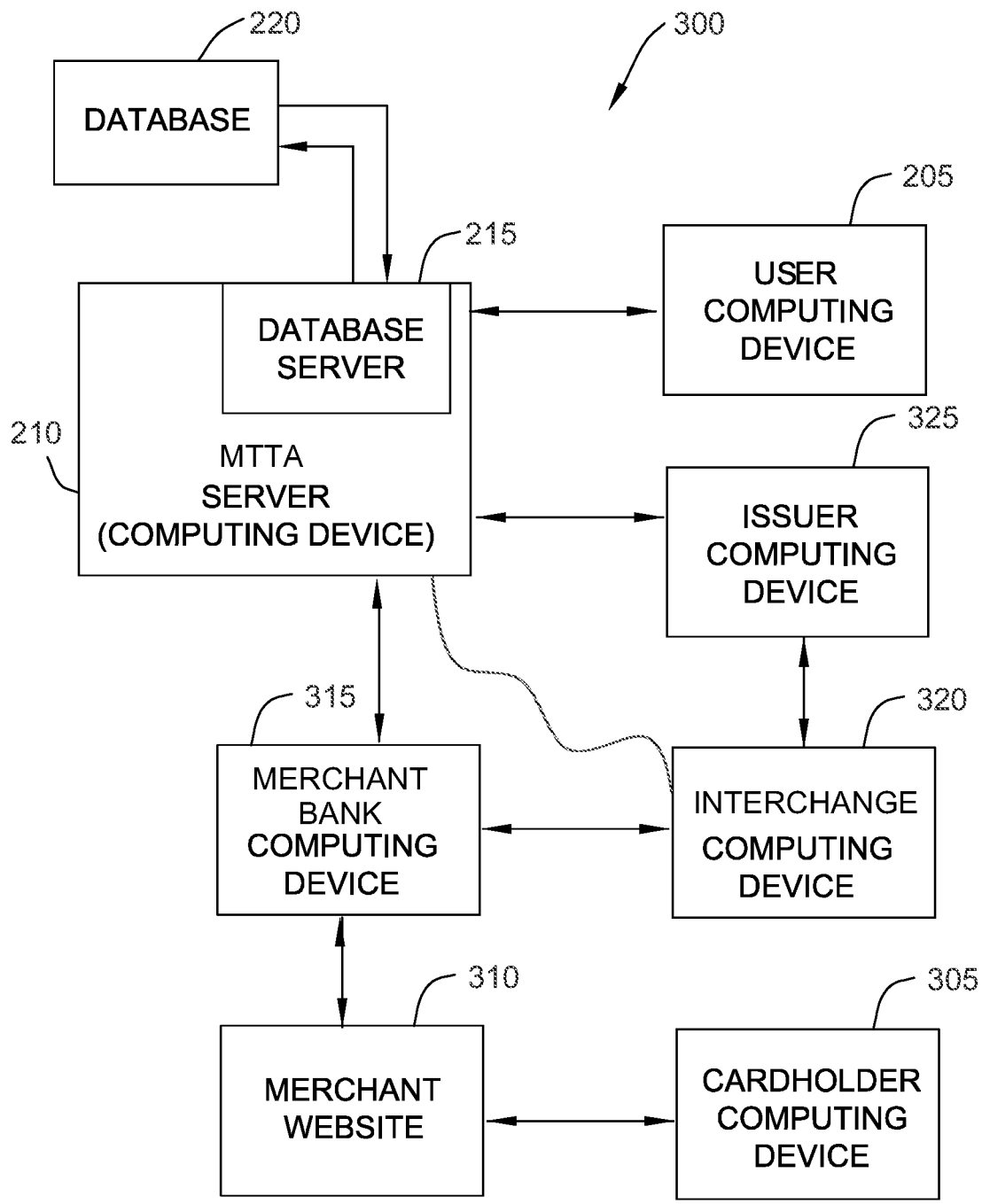

FIG. 3 is an expanded block diagram of an example embodiment of a computer system 300 used in analyzing message traffic for transactions. In the exemplary embodiment, system 300 may be used for monitoring message traffic associated with transactions. These transactions may include payment transactions as well as users attempting to access secure information over computer networks. In at least one embodiment, system 300 is in communication with processing system 20. In additional embodiments, system 300 is a part of processing system 20.

In the exemplary embodiment, cardholder computing devices 305 are computers that include a web browser or a software application, which enables cardholder computing devices 305 to access remote computer devices, such as merchant website 310, using the Internet or other network. More specifically, cardholder computing devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Cardholder computing devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, cardholder computing devices 305 are associated with individual cardholders 22 (shown in FIG. 1).

In the exemplary embodiment, merchant website 310 is an online shopping website that is reachable through computers that include a web browser or a software application, such as cardholder computing devices 305, using the Internet or other network. More specifically, merchant website 310 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Computing devices hosting merchant website 310 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, merchant website 310 are associated with merchant 24 (shown in FIG. 1). In the exemplary embodiment, merchant website 310 allows cardholder 22 to purchase goods and/or services using cardholder computing device 305. In some embodiments, transactions performed through merchant website 310 are considered card not present transactions. These transactions may include users attempting to access secure information over computer networks In the exemplary embodiment, merchant bank computer devices 315 are computers that include a web browser or a software application, which enables merchant bank computer devices 315 to access remote computer devices, such as MTTA server 210, merchant website 310, and interchange computing device 320, using the Internet or other network. More specifically, merchant bank computing devices 315 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Merchant bank computer devices 315 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the merchant bank computing devices 315 are associated with the acquirer bank 26 (shown in FIG. 1).

In the exemplary embodiment, interchange computing devices 320 are computers that include a web browser or a software application, which enables interchange computing devices 320 to access remote computer devices, such as MTTA server 210, merchant bank computing device 315, and issuer computing device 325 using the Internet or other network. More specifically, interchange computing devices 320 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Interchange computing devices 320 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the interchange computing devices 320 are associated with the interchange network 28 (shown in FIG. 1).

In the exemplary embodiment, issuer computing devices 325 are computers that include a web browser or a software application, which enables issuer computing devices 325 to access remote computer devices, such as MTTA server 210 and interchange computing device 320, using the Internet or other network. More specifically, issuer computing devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Issuer computing devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, the interchange computing devices 320 are associated with the issuer bank 30 (shown in FIG. 1).

In the exemplary embodiments, MTTA server 210 is in communication with a plurality of computer devices to collect messaging traffic including payment transactions. In the exemplary embodiment, MTTA server 210 is a computer that include a web browser or a software application, which monitors message traffic between one or more of merchant bank computing device 315, interchange computing device 320, and/or issuer computing device 325, using the Internet or other network. In the exemplary embodiment, MTTA server 210 receives messaging data from one or more of the above computing devices and uses that data to analyze transactions. In some embodiments, the MTTA server 210 receives data from one or more of the above computing devices and uses that data to perform authentication of transactions, such as payment transactions and users attempting to access secure information. In some embodiments, MTTA server 210 is similar to MTTA platform 34 (shown in FIG. 1). In the exemplary embodiment, MTTA server 210 receives copies of transactions from one or more of merchant bank computing device 315, interchange computing device 320, and/or issuer computing device 325 and uses that data to analyze the messages as described further herein. In some embodiments, the MTTA server 210 receives real-time transaction data and detects whether or not there are abnormalities with the transaction data based on the profile of the messaging traffic for the merchant bank computing device 315, interchange computing device 320, and/or issuer computing device 325. In the exemplary embodiment, MTTA server 210 is associated with the interchange network 28. In other embodiments, the MTTA server 210 is merely in communication with the interchange network 28. More specifically, MTTA servers 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. MTTA servers 210 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 215 is connected to database 220. In one embodiment, centralized database 220 is stored on MTTA server 210 and can be accessed by potential users at one of user computing devices 205 by logging onto MTTA server 210. In an alternative embodiment, database 220 is stored remotely from MTTA server 210 and may be non-centralized. Database 220 may be a database configured to store information used by MTTA server 210 including, for example, historical transaction records, including both payment transactions and users attempting to access secure information.

Database 220 may include a single database having separated sections or partitions, or may include multiple databases, each being separate from each other. Database 220 may store transaction data generated over the processing network including data relating to merchants, consumers, account holders, prospective customers, issuers, acquirers, and/or purchases made. Database 220 may also store account data including at least one of a cardholder name, a cardholder address, an account number, other account identifiers, and transaction information. Database 220 may also store merchant information including a merchant identifier that identifies each merchant registered to use the network, and instructions for settling transactions including merchant bank account information. Database 220 may also store purchase data associated with items being purchased by a cardholder from a merchant, and authentication and authorization request data. Database 220 may store one or more authentication profiles, where each authentication profile includes one or more authentication rules, one or more fraud probability level thresholds, and one or more routing rules based on the fraud probability level thresholds. In the exemplary embodiment, database 220 may store one or more determined rules. Furthermore, the database 220 may also store thresholds and/or preferences. These thresholds and/or preferences may be set by a user with a user computing device 205.

Figure 4:
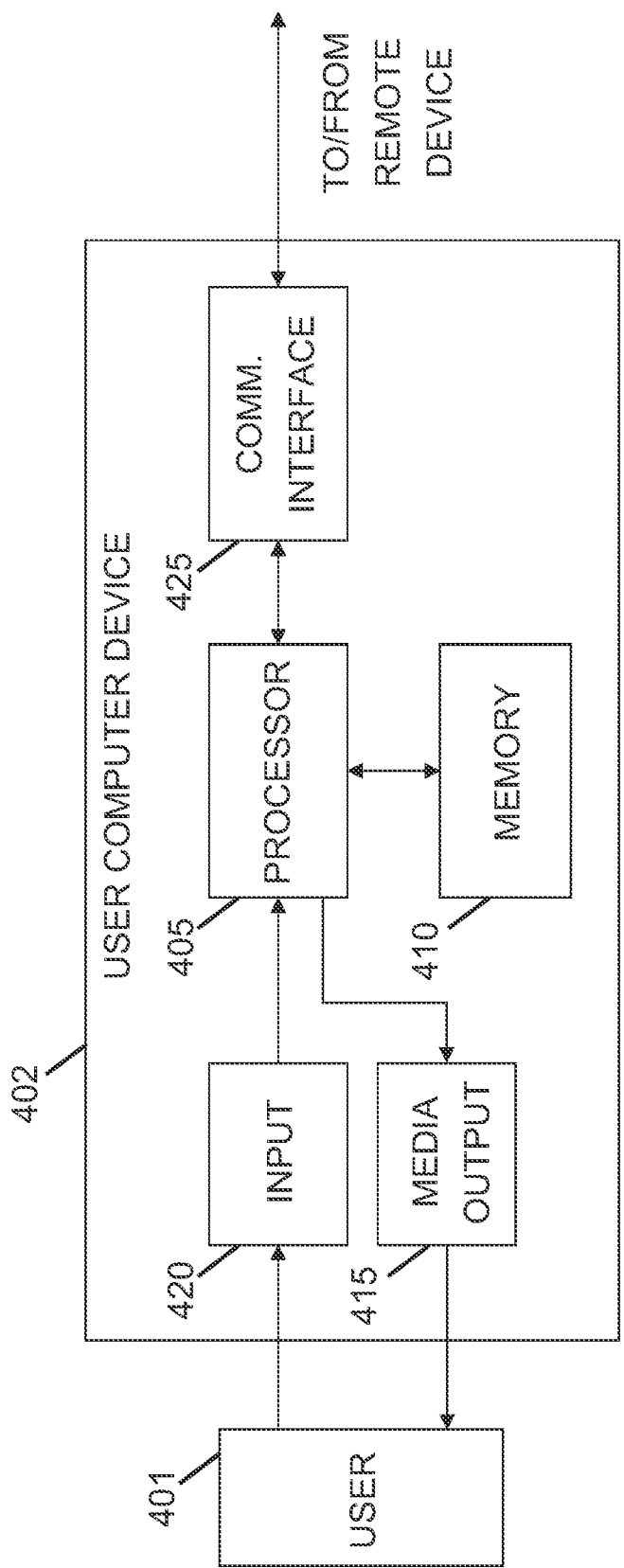

FIG. 4 illustrates an example configuration of a user computing device 402. User computing device 402 may include, but is not limited to, user computing device 205 (shown in FIG. 2), and cardholder computing device 305, and merchant website 310 (both shown in FIG. 3). User computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

User computing device 402 also includes at least one media output component 415 for presenting information to a user 400. Media output component 415 is any component capable of conveying information to user 400. In some embodiments, media output component 415 includes an output adapter such as a video adapter and/or an audio adapter. An output adapter is operatively coupled to processor 405 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, user computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

User computing device 402 may also include a communication interface 425, which is communicatively couplable to a remote device such as MTTA server 210 (shown in FIG. 2) or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from MTTA server 210. A client application allows user 401 to interact with, for example, message traffic and/or transaction reports. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 may be programmed with the instructions such as process 1400 (shown in FIG. 14).

Figure 5:
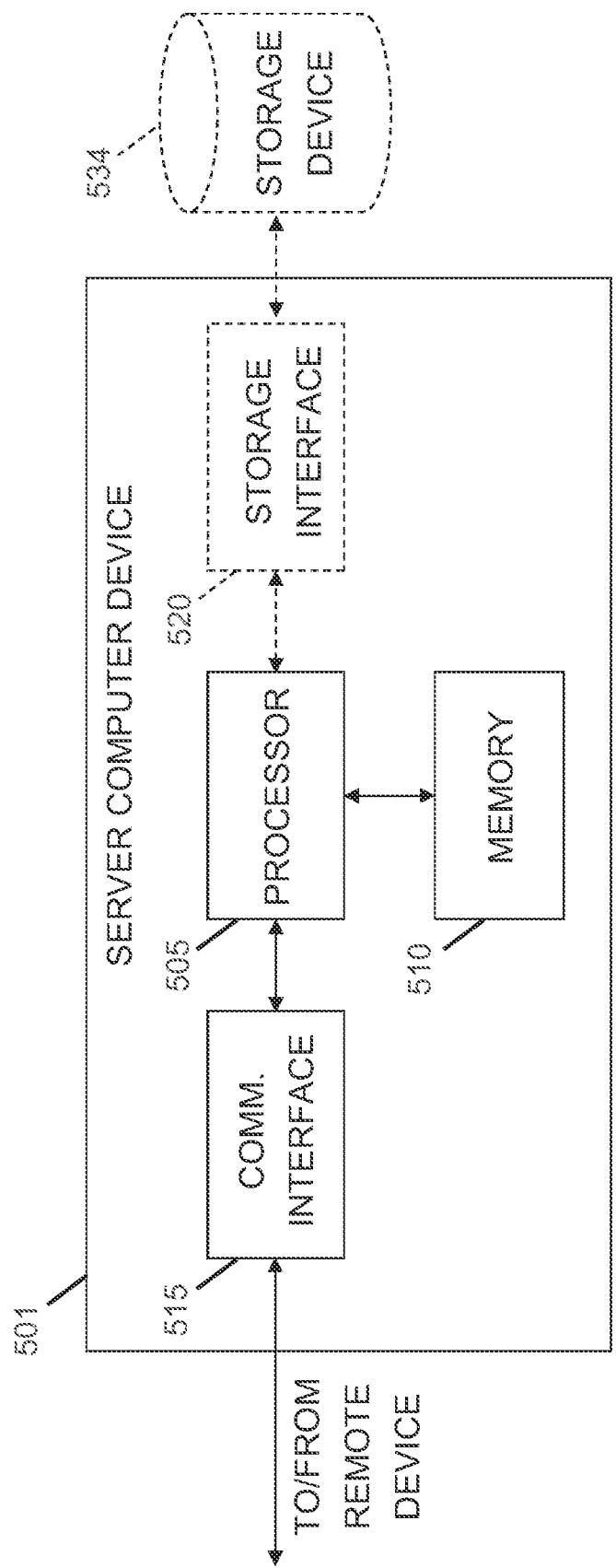

FIG. 5 illustrates an example configuration of a server system 301 such as MTTA platform 34 (shown in FIG. 1), in accordance with one example embodiment of the present disclosure. Server system 501 may also include, but is not limited to, MTTA platform 34 (shown in FIG. 1), MTTA server 210, database server 215, messaging routing server 225, destination server 230 (all shown in FIG. 2), merchant website 310, merchant bank computing device 315, interchange computing device 320, and issuer computing device 325 (all shown in FIG. 3). In the example embodiment, server system 501 determines and analyzes patterns in message traffic and transactions, as described herein.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests from a user computing device 205 via the Internet, as illustrated in FIG. 2.

Processor 505 may also be operatively coupled to a storage device 534. Storage device 534 is any computer-operated hardware suitable for storing and/or retrieving data. In some embodiments, storage device 534 is integrated in server system 501. For example, server system 501 may include one or more hard disk drives as storage device 534. In other embodiments, storage device 534 is external to server system 501 and may be accessed by a plurality of server systems 501. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
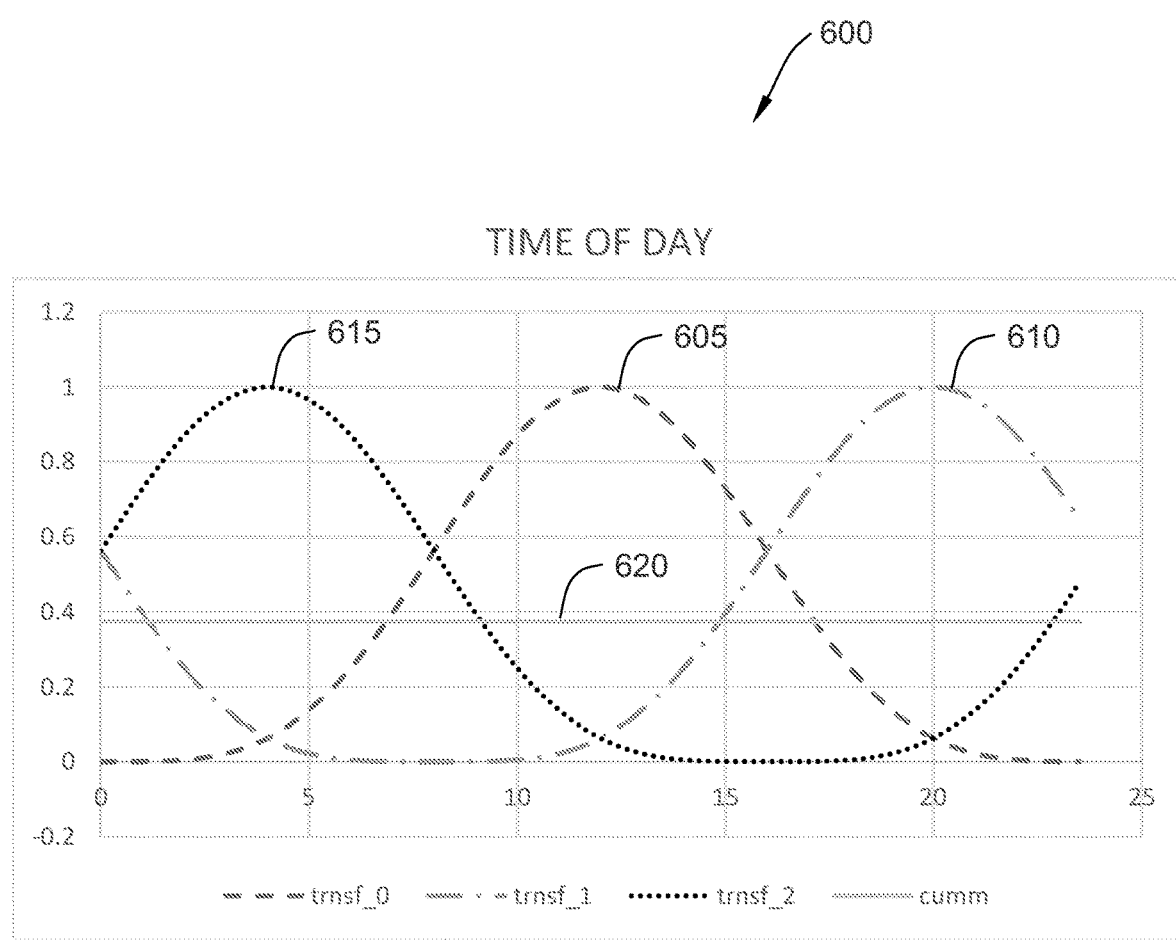

FIG. 6 illustrates a graph 600 of a timestamp triangular transformation based on hours of a day, in accordance with at least one embodiment. Graph 600 includes four lines including a first time shifted line 605, a second time shifted line 610, a third time shifted line 615, and a cumulative line 620.

The first time shifted line 605 represents a time shift of 12 hours. The second time shifted line 610 represents a time shift of 20 hours. The third time shifted line 615 represents a time shift of 4 hours. Each one of the time shifted lines is more sensitive to detecting message traffic at different points in the day. By having the three different time shifts overlap, more coverage can be provided for the model. The first time shifted line 605 is more sensitive between 4 AM and 4 PM, with 12 PM being the most sensitive. The second time shifted line 610 is most sensitive at 4 AM. And the third time shifted line 615 is most sensitive at 8 PM. The cumulative line 620 is the combined values of the three time shifted and transformed values from the other lines 605, 610, and 615.

In the exemplary embodiment, the MTTA server 210 (shown in FIG. 2) transforms timestamps using the following process. The MTTA server 210 transforms time shifted timestamps into radians where a full time period, such as a 24 hour day, is $2\pi$. The times of the day are in radians and represent the portion of the day that has passed. The MTTA server 210 considers: time unit and time scale (e.g. time of the day). The MTTA server 210 calculates the number of time units t passed from the beginning of the time scale. For example, if the time unit is 1 second and time scale is 1 day, then, for 13:30:40 (number of seconds from the beginning of the day until the current time):

$$t = 13*60*60 + 30*60 + 40 \qquad \text{EQ. 1}$$

The MTTA server 210 calculates the total number of time units in the time scale (number of seconds in a day):

$$T = 24*60*60 \quad \text{EQ. 2}$$

The MTTA server 210 may also shift the basis of time. For example, the base point is noon. Then:

$$S = 12*60*60 \quad \text{EQ. 3}$$

The MTTA server 210 calculates the shifted time relative to the scale:

$$Rt = (t-S)/T \quad \text{EQ. 4}$$

The MTTA server 210 transforms the relative time to angular space:

$$Wt = Rt*2*Pi \quad \text{EQ. 5}$$

The MTTA server 210 applies cosine or sine on the angle:

$$Dt = \cos(Wt/2) \text{ or } \sin(Wt/2) \quad \text{EQ. 6}$$

This can be rewritten as:

$$Dt = \cos(a*Wt) \text{ or } \sin(a*Wt) \quad \text{EQ. 7}$$

where a is a coefficient. Alternatively, the MTTA server 210 can use hyperbolic tangents, which provide sharper edges and peaks, as shown in other figures.

$$Dt = 1 - \tanh(2*Wt) \quad \text{EQ. 8}$$

Which can be rewritten as:

$$Dt = c - \tanh(a*Wt) \quad \text{EQ. 9}$$

In some embodiments, the MTTA server 210 can apply a power the product can adjust the signal further:

$$Pt = Dt^\wedge p \quad \text{EQ. 10}$$

where, p is the power. The monitoring system can use Pt, its velocities, and/or relative values of its velocities to other velocities to be inputs into the models.

Furthermore, the MTTA server 210 systems can have multiple shifts per time scale. For example, the three time shifts in a day (8-hour shifts) are shown in FIG. 6. In this way, each signal is more sensitive to ⅓ of the day. In other embodiments and/or situations, other numbers of and amounts of time shifts may be performed based on different use cases and/or situations. Since the time shifted lines 605, 610, and 615 each have areas above the cumulative line 620, the model can get the three signals and figure out what specific traffic is expected from each shift.

Furthermore, the methods seen above can also be applied to days of the week, days of the month, days of the year, months of the year, and/or any other period of time for the desired analysis and use case.

The model can use the shifted and transformed values as well as their ratios, such as, but not limited to, shift1/shift2 as well as other transformations including, but not limited to a distribution function. Furthermore, the model can also take into account contour and velocity of the three lines 605, 610, and 615 and corresponding messages. For example, the model can include a profile of a specific signal and its velocity.

Figure 7:
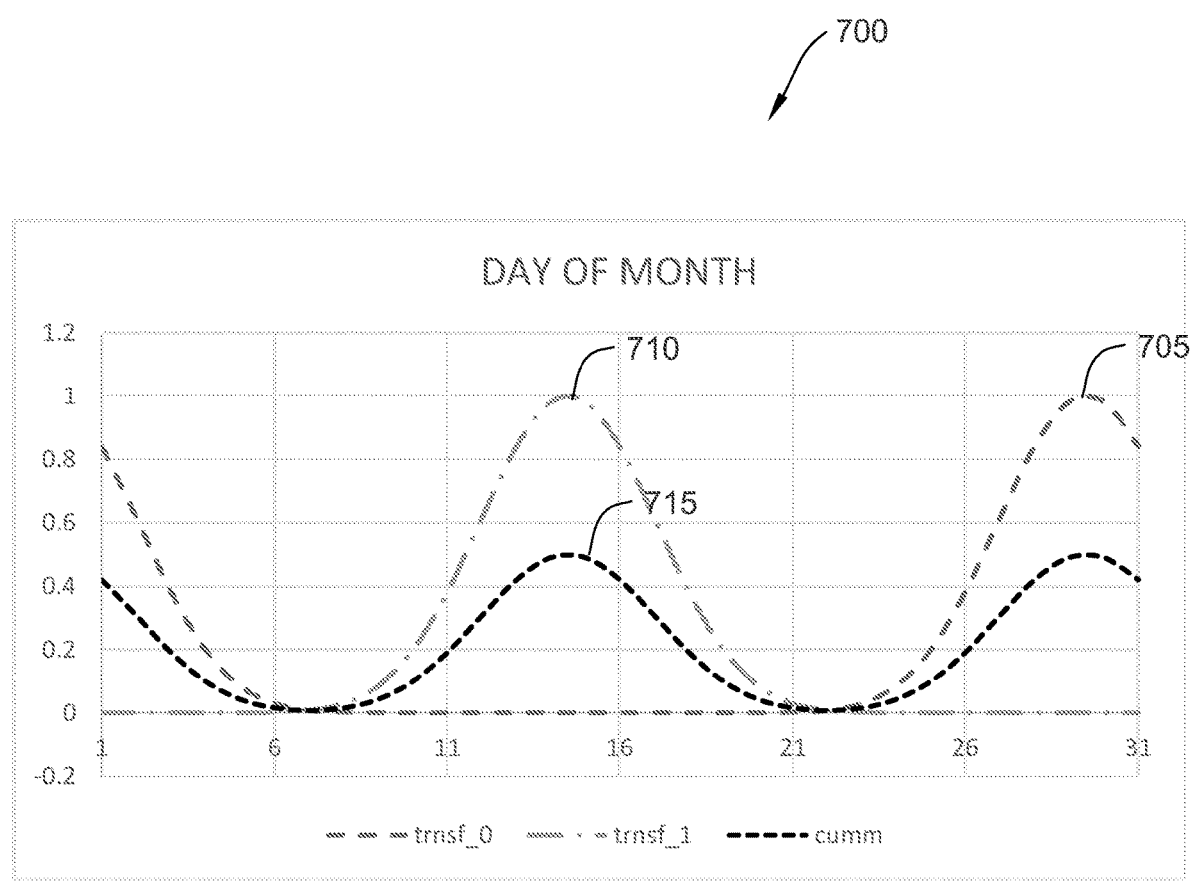

FIG. 7 illustrates a graph 700 of a timestamp triangular transformation based on days of a month, in accordance with at least one embodiment. Graph 700 includes three lines including a first time shifted line 705, a second time shifted line 710, and cumulative line 715.

The first time shifted line 705 represents a time shift of 28.5 days. The second time shifted line 710 represents a time shift of 14.5 days. In the case of transactions, these messages at these days could represent individuals that are paid monthly versus weekly. The cumulative line 715 is the combined values of the two time shifted and transformed values from the other lines 705 and 710. In this graph 700, the days around the beginning, middle, and end of the month are the most sensitive.

Figure 8A:
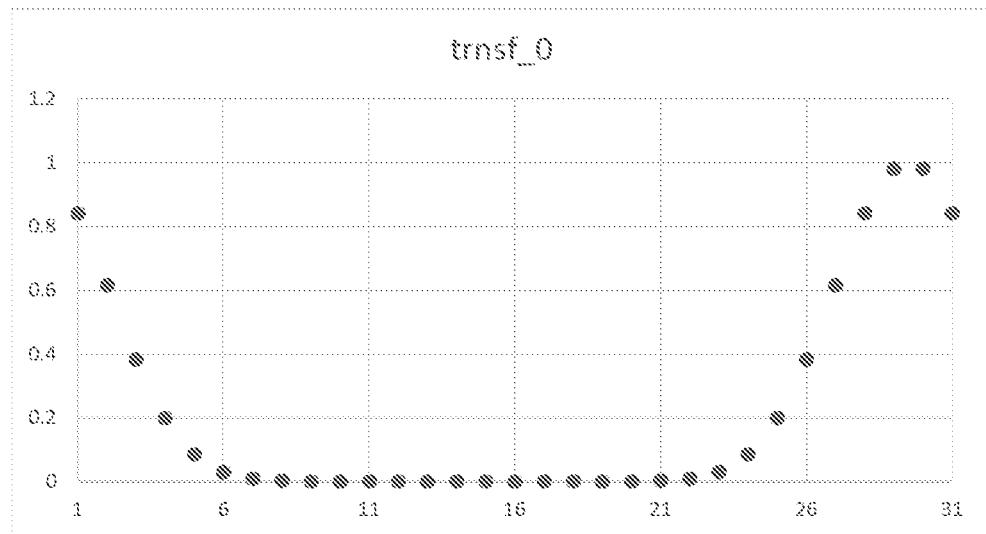
FIGS. 8A and 8B illustrate graphs of the first time shifted line and the second time shifted line both shown in FIG. 7, respectively.
Figure 8B:
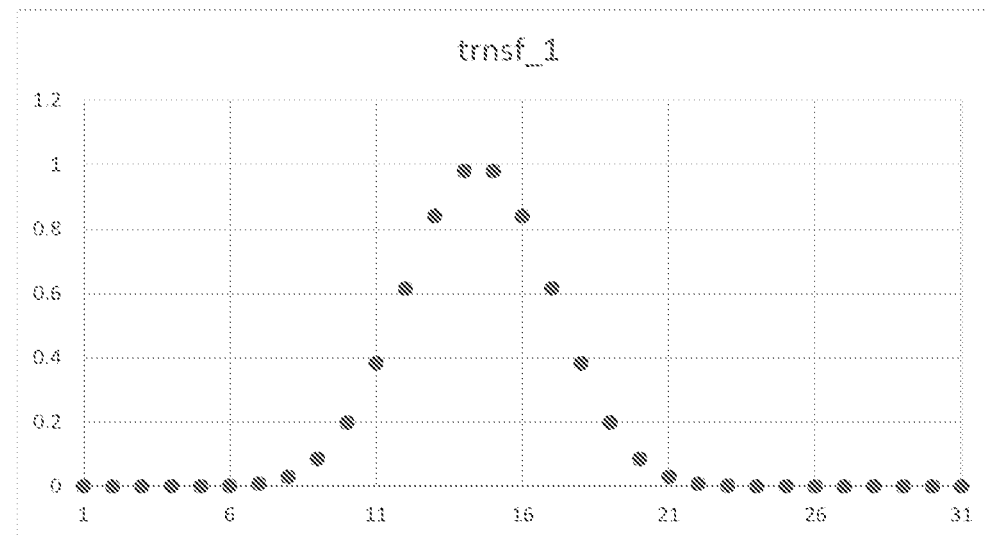

FIGS. 8A and 8B illustrate graphs of the first time shifted line 705 and the second time shifted line 710 (both shown in FIG. 7), respectively.

Figure 9:
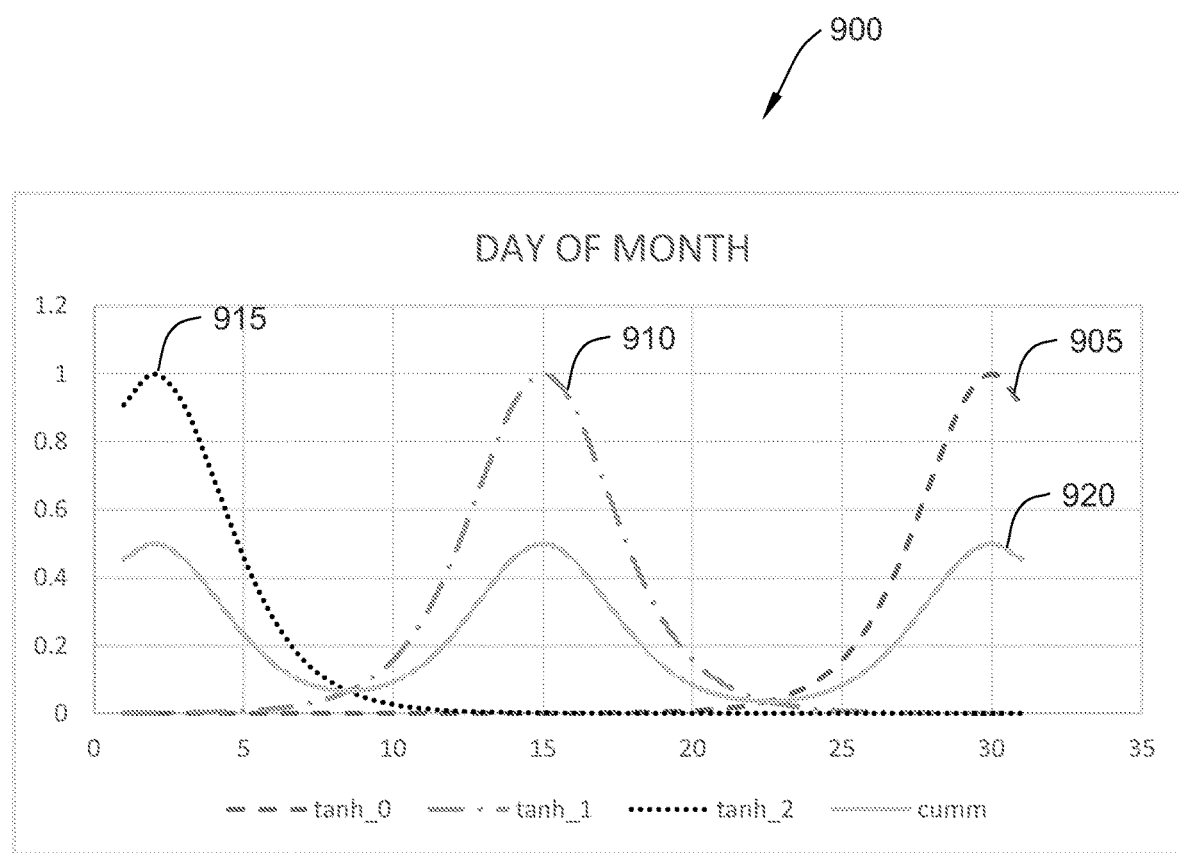

FIG. 9 illustrates another graph 900 of a timestamp triangular transformation based on days of a month, in accordance with at least one embodiment. Graph 900 includes four lines including a first time shifted line 905, a second time shifted line 910, a third time shifted line 915, and a cumulative line 920.

The first time shifted line 905 is similar to first time shifted line 705 (shown in FIG. 7) representing a time shift of 28.5 days. The second time shifted line 910 is similar to second time shifted line 710 (shown in FIG. 7) representing a time shift of 14.5 days. However, first time shifted line 905 and second time shifted line 910 are both transformed using the hyperbolic tangent function instead of the cosine function, which was used for first time shifted line 705 and second time shifted line 710. Accordingly, the slopes and peaks of first time shifted line 905 and second time shifted line 910 are sharper than those in FIG. 7, and accordingly, cover less area. Therefore, the third time shifted line 915 is added, which represents a time shift of a single day. The cumulative line 920 is the combined values of the three time shifted and transformed values from the other lines 905, 910, and 915. In this graph 900, the days around the beginning, middle, and end of the month are the most sensitive.

Figure 10A:
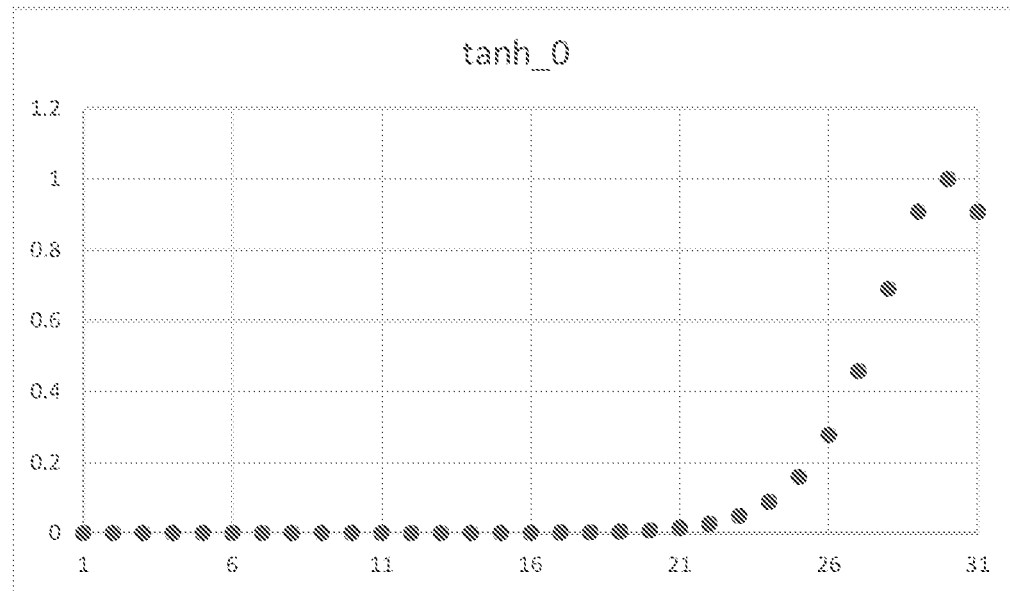
FIGS. 10A, 10B, and 10C illustrate graphs of the first time shifted line, the second time shifted line, and the third time shifted line all shown in FIG. 9, respectively.
Figure 10B:
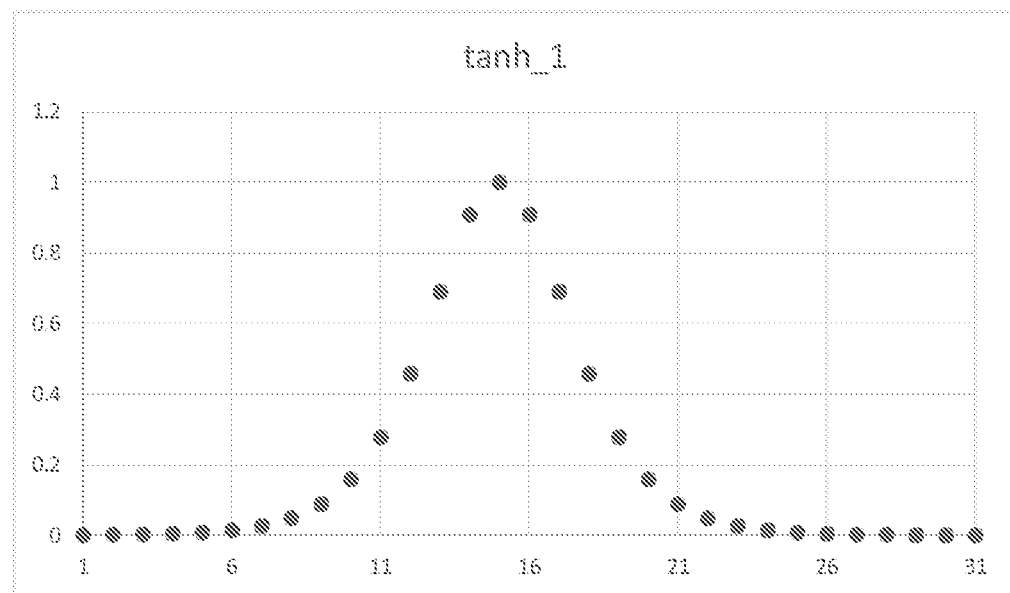
Figure 10C:
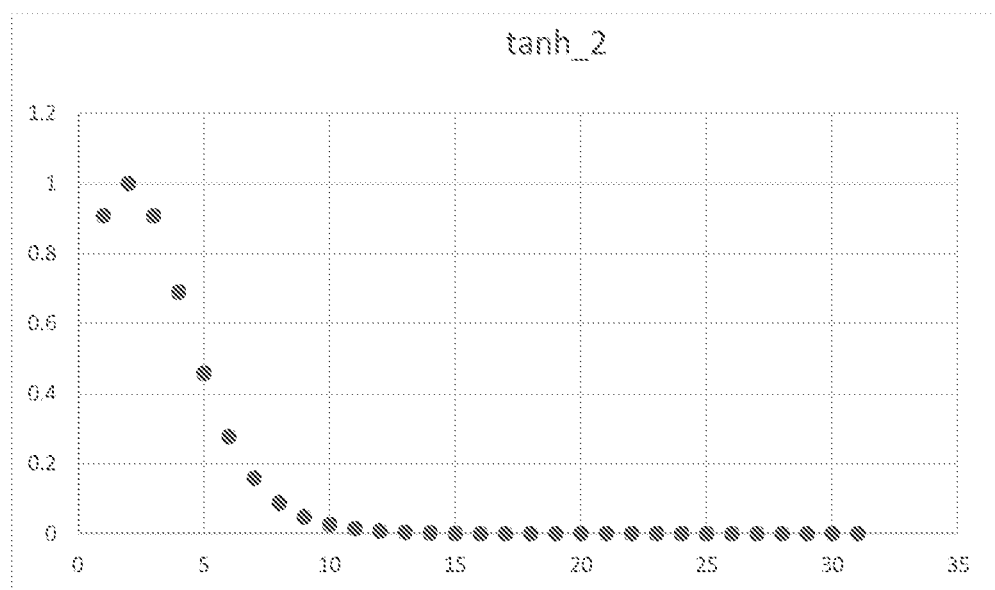

FIGS. 10A, 10B, and 10C illustrate graphs of the first time shifted line 905, the second time shifted line 910, and the third time shifted line 915 (all shown in FIG. 9), respectively.

Figure 11:
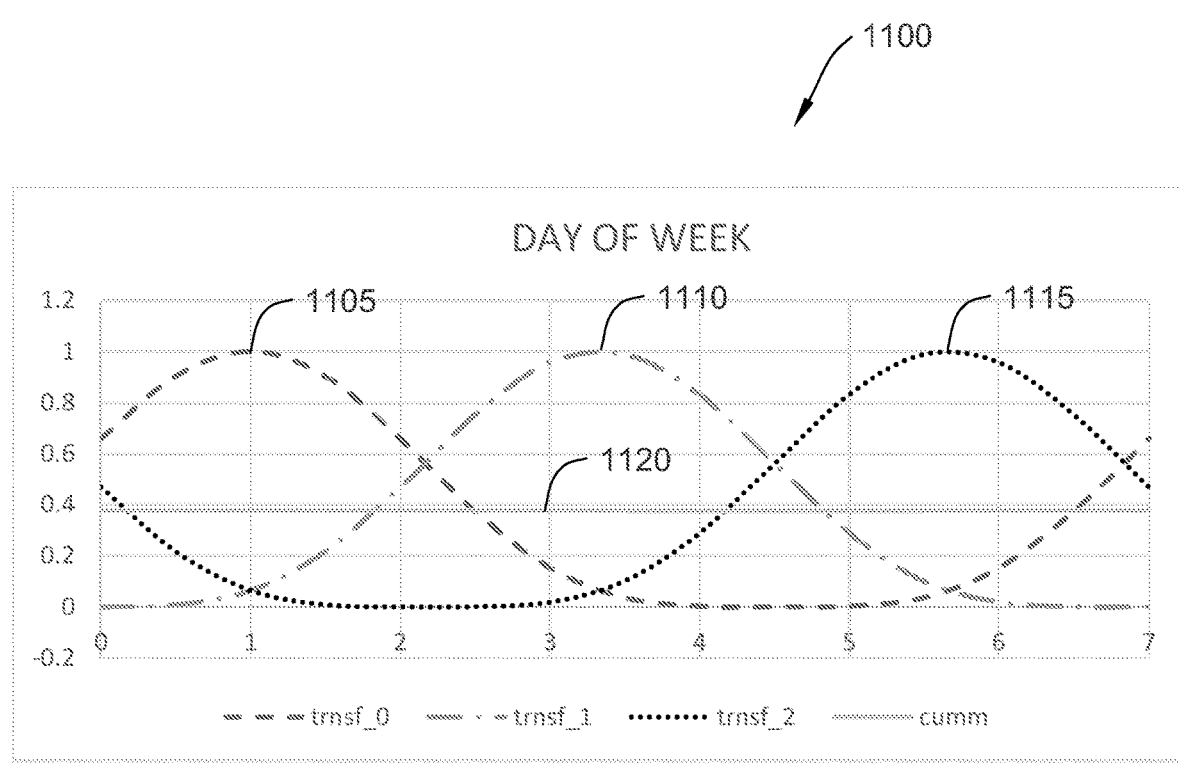

FIG. 11 illustrates a graph 1100 of a timestamp triangular transformation based on days of a week, in accordance with at least one embodiment. Graph 1100 includes four lines including a first time shifted line 1105, a second time shifted line 1110, a third time shifted line 1115, and a cumulative line 1120.

The first time shifted line 1105 represents a time shift of one day, concentrating on the Monday-Tuesday timeframe. The second time shifted line 1110 represents a time shift of 3.33 day, concentrating on the Wednesday-Thursday timeframe. The third time shifted line 1115 represents a time shift of 5.67 days, concentrating on the Saturday-Sunday weekend timeframe. In the case of transactions, these messages at these days could represent the different busy times of different businesses. For example, some businesses may be busy at the beginning of the week, while others are busy on the weekend. The cumulative line 1120 is the combined values of the three time shifted and transformed values from the other lines 1105, 1110, and 1115.

Since the time shifted lines 1105, 1110, and 1115 each have areas above the cumulative line 1120, the model can get the three signals and figure out what specific traffic is expected from each shift.

Figure 12A:
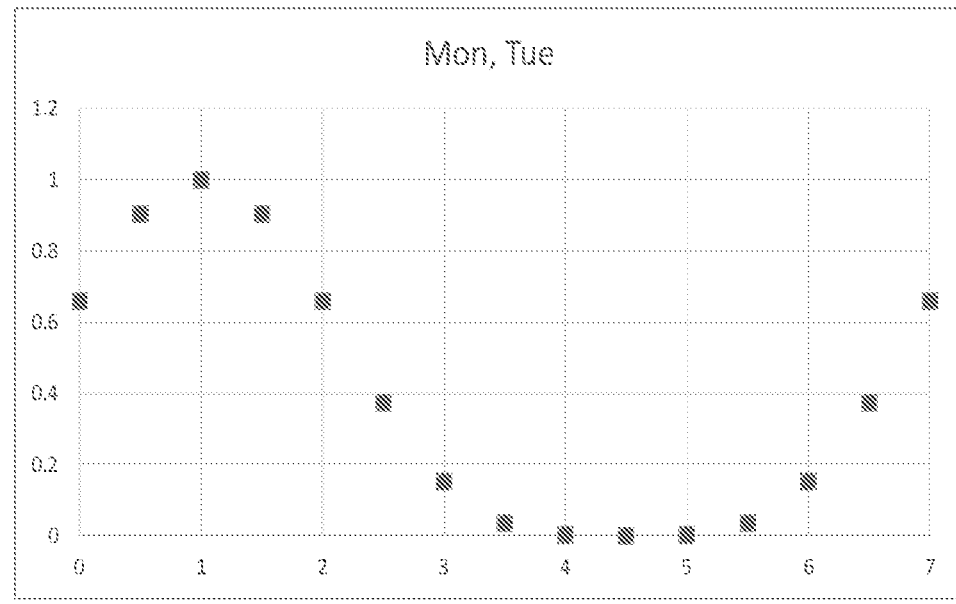
FIGS. 12A, 12B, and 12C illustrate graphs of the first time shifted line, the second time shifted line, and the third time shifted line all shown in FIG. 11, respectively.
Figure 12B:
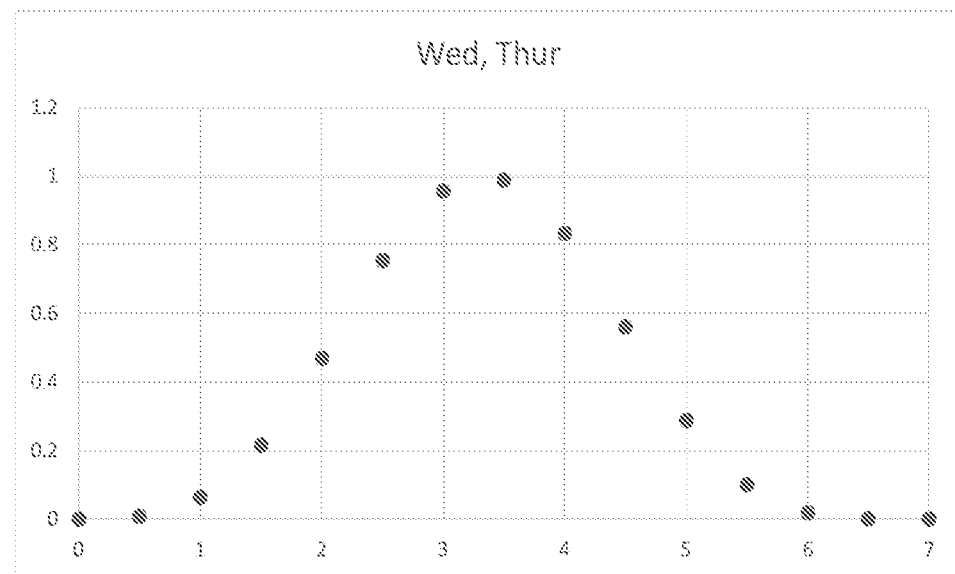
Figure 12C:
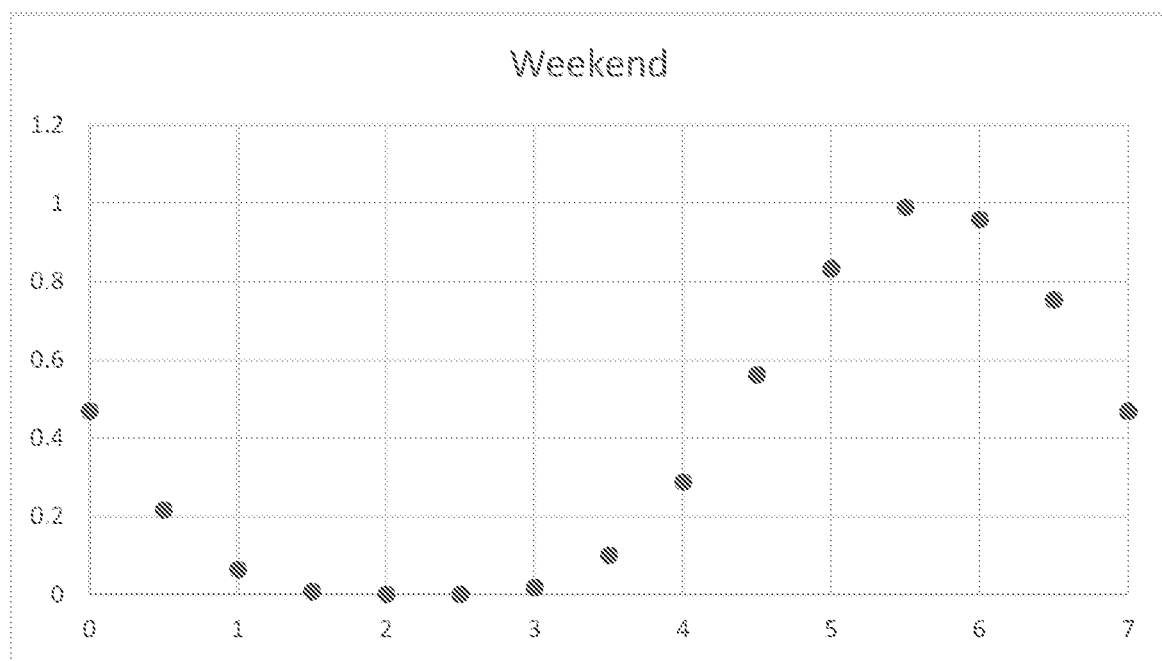

FIGS. 12A, 12B, and 12C illustrate graphs of the first time shifted line 1105, the second time shifted line 1110, and the third time shifted line 1115 (all shown in FIG. 11), respectively.

Figure 13:
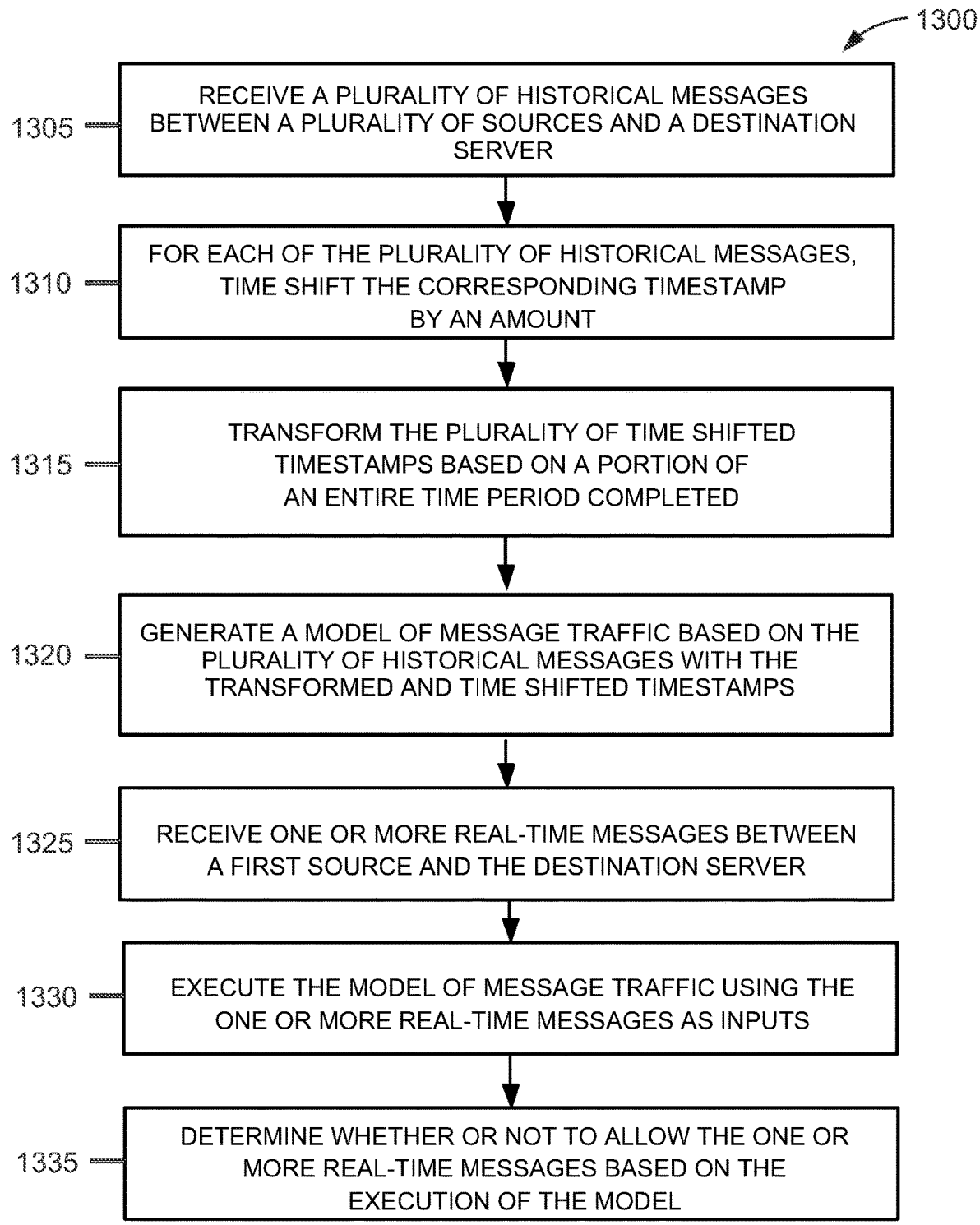

FIG. 13 is a flow diagram of an example process 1300 for performing timestamp triangular transformation on message traffic using the MTTA system 200 and 300 (shown in FIGS. 2 and 3). In the exemplary embodiment, process 1300 is performed by the MTTA server 210 (shown in FIG. 2). In some embodiments, process 1300 is performed by the MTTA server 210 on message traffic between a plurality of user computer devices 205 and a destination server 230 (as shown in FIG. 2). IN other embodiments, process 1300 is performed by the MTTA server 210 on transactions in the processing system 20 (shown in FIG. 1) using the MTTA system 300 (shown in FIG. 3).

In the exemplary embodiment, the MTTA server 210 receives 1305 a plurality of historical messages between a plurality of sources for a destination server 230. Each message of the plurality of historical messages includes a timestamp. In some embodiments, the plurality of sources include a plurality of user computer devices 205 (shown in FIG. 2). In at least some of these embodiments, the MTTA server 210 receives 1305 the plurality of messages from destination server 230. In other embodiments, the plurality of sources include cardholder computing devices 305 (shown in FIG. 3). In these embodiments, the MTTA server 210 receives 1305 the plurality of historical messages from one or more of the merchant bank computing device 315, the interchange computing device 320, the issuer computer device 325 (all shown in FIG. 3), the merchant 24, the merchant bank 26, the interchange network 28, and/or the issuer/processor 30 (all shown in FIG. 1).

For each of the plurality of historical messages, the MTTA server 210 time shifts 1310 the corresponding timestamp by an amount. The amount for the time shift is determined by the use case. For example, the time shift could be for 4 hours or 4 days, depending on the total time period being analyzed. In some embodiments, the MTTA server 210 time shifts 1310 a time or a date of the time stamp by a first amount to create a first shifted timestamp. The MTTA server 210 time shifts 1310 the time or data of the time stamp by a second amount to create a second shifted timestamp. The MTTA server 210 time shifts 1310 the time or data of the time stamp by a third amount to create a third shifted timestamp.

In the exemplary embodiment, the MTTA server 210 transforms 1315 the plurality of time shifted timestamps based on a portion of an entire time period completed. In some embodiments, the MTTA server 210 transforms 1315 the time shifted timestamp into radians for the portion of the entire time period completed. In some embodiments, the MTTA server 210 applies a function of cosine or sine to the radians of the timestamp. The entire time period may be one of a day, a week, a month, or a year.

In the exemplary embodiment, the MTTA server 210 generates 1320 a model of message traffic based on the plurality of historical messages with the transformed and time shifted timestamps. In some embodiments, the MTTA server 210 generates 1320 the model using one or more of the first shifted timestamp, the second shifted timestamp, and the third shifted timestamp. In other embodiments, the MTTA server 210 applies a hyperbolic tangent function to the radians of the timestamp. In some further embodiments, the MTTA server 210 applies a power to results of the function.

In the exemplary embodiment, the MTTA server 210 receives 1325 one or more real-time messages between a first source and the destination server 230. In some embodiments, the one or more real-time messages are received 1325 from one of the message routing server 225 and the destination server 230. In other embodiments, the one or more real-time messages are received 1325 from one or more of the merchant bank computing device 315, the interchange computing device 320, and the issuer computer device 325.

In the exemplary embodiment, the MTTA server 210 executes 1330 the model of message traffic using the one or more real-time messages as inputs.

In the exemplary embodiment, the MTTA server 210 determines 1335 whether or not to allow the one or more real-time messages based on the execution of the model. In some embodiments, the MTTA server 210 transmits one or more alerts based on the execution of the model, such as to the destination server 230, the merchant 24, the merchant bank 26, the interchange network 28, and/or the issuer/processor 30. In some further embodiments, the MTTA server 210 discard the one or more real-time messages based on the execution of the model, thereby preventing them from reaching the destination server 230.

In some embodiments, the MTTA server 210 retrieves one or more timestamps associated with the one or more real-time messages. The MTTA server 210 time shifts and transforms the one or more timestamps associated with the one or more real-time messages. The MTTA server 210 adjusts the one or more real-time messages with the time shifted and transformed one or more timestamps. The MTTA server 210 server executes the model of message traffic using the one or more adjusted real-time messages at inputs.

In further embodiments, the plurality of historical messages are a first plurality of message traffic. The MTTA server 210 receives a second plurality of message traffic, including a second plurality of timestamps. For each message of the second plurality of message traffic, the MTTA server 210 time shifts the corresponding timestamp by the amount. The MTTA server 210 transforms the second plurality of time shifted timestamps based on a portion of an entire time period completed. Then the MTTA server 210 updates the model of message traffic based on the second plurality of message traffic with the transformed and time shifted timestamps.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing fraud probabilities.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A message traffic analysis system comprising a message timestamp transformation analysis (MTTA) server communicatively coupled to a destination server, the MTTA server comprising:
    a memory device; and
    at least one processor coupled to the memory device, the at least one processor programmed to:
        receive, from the destination server, a plurality of historical messages that have been routed through a message routing server between a plurality of sources and the destination server, wherein each message of the plurality of historical messages includes a timestamp;
        for each of the plurality of historical messages, time shift the corresponding timestamp by:
            calculating an initial timestamp value as a number of time units that have passed from a beginning of a time scale;
            calculating a total number of time units in the time scale;
            calculating a time shift value based on a base point that is different from the beginning of the time scale; and
            calculating the time shifted timestamp as a difference between the initial timestamp value and the time shift value, divided by the total number of time units in the time scale;
        transform the plurality of time shifted timestamps based on a portion of an entire time period completed;
        generate a model of message traffic based on the plurality of historical messages with the transformed and time shifted timestamps;
        receive one or more real-time messages between a first source and the destination server;
        execute the model of message traffic using the one or more real-time messages as inputs; and
        determine whether or not to prevent the one or more real-time messages from reaching the destination server based on the execution of the model.

2. The message traffic analysis system of claim 1, wherein the at least one processor is further programmed to:
    retrieve one or more timestamps associated with the one or more real-time messages;
    time shift and transform the one or more timestamps;
    adjust the one or more real-time messages with the time shifted and transformed one or more timestamps; and
    execute the model of message traffic using the one or more adjusted real-time messages at inputs.

3. The message traffic analysis system of claim 1, wherein the time shifted timestamp for each of the plurality of historical messages is a first shifted timestamp.

4. The message traffic analysis system of claim 3, wherein the at least one processor is further programmed to create a second shifted timestamp for each of the plurality of historical messages.

5. The message traffic analysis system of claim 4, wherein the at least one processor is further programmed to create a third shifted timestamp for each of the plurality of historical messages.

6. The message traffic analysis system of claim 5, the at least one processor is further programmed to generate the model using one or more of the first shifted timestamp, the second shifted timestamp, and the third shifted timestamp.

7. The message traffic analysis system of claim 1, wherein to transform the plurality of time shifted timestamps, the at least one processor is further programmed to transform each time shifted timestamp into a corresponding angle by multiplying the time shifted timestamp by $2\pi$.

8. The message traffic analysis system of claim 7, wherein to transform the plurality of time shifted timestamps, the at least one processor is further programmed to apply a function of cosine or sine to the angle corresponding to each time shifted time stamp.

9. The message traffic analysis system of claim 8, wherein the at least one processor is further programmed to apply a power to results of the function.

10. The message traffic analysis system of claim 7, wherein to transform the plurality of time shifted timestamps, the at least one processor is further programmed to apply a hyperbolic tangent function to the angle corresponding to each time shifted time stamp.

11. The message traffic analysis system of claim 1, wherein the plurality of historical messages are a first plurality of message traffic, and wherein the at least one processor is further programmed to:
receive a second plurality of message traffic, including a second plurality of timestamps;
for each message of the second plurality of message traffic, time shift the corresponding timestamp;
transform the second plurality of time shifted timestamps based on a portion of an entire time period completed; and
update the model of message traffic based on the second plurality of message traffic with the transformed and time shifted timestamps.

12. The message traffic analysis system of claim 1, wherein the entire time period is one of a day, a week, a month, or a year.

13. The message traffic analysis system of claim 1, wherein the at least one processor is further programmed to transmit one or more alerts based on the execution of the model.

14. The message traffic analysis system of claim 1, wherein the at least one processor is further programmed to discard the one or more real-time messages based on the execution of the model.

15. A computer-implemented method for message traffic analysis, the method implemented on a message timestamp transformation analysis (MTTA) server communicatively coupled to a destination server and comprising a memory device coupled to at least one processor, the method comprising:
receiving, from the destination server, a plurality of historical messages that have been routed through a message routing server between a plurality of sources and the destination server, wherein each message of the plurality of historical messages includes a timestamp;
for each of the plurality of historical messages, time shifting the corresponding timestamp by:
calculating an initial timestamp value as a number of time units that have passed from a beginning of a time scale;
calculating a total number of time units in the time scale;
calculating a time shift value based on a base point that is different from the beginning of the time scale; and
calculating the time shifted timestamp as a difference between the initial timestamp value and the time shift value, divided by the total number of time units in the time scale;
transforming the plurality of time shifted timestamps based on a portion of an entire time period completed;
generating a model of message traffic based on the plurality of historical messages with the transformed and time shifted timestamps;
receiving one or more real-time messages between a first source and the destination server;
executing the model of message traffic using the one or more real-time messages as inputs; and
determining whether or not to prevent the one or more real-time messages from reaching the destination server based on the execution of the model.

16. The method of claim 15 further comprising:
retrieving one or more timestamps associated with the one or more real-time messages;
time shifting and transform the one or more timestamps
adjusting the one or more real-time messages with the time shifted and transformed one or more timestamps; and
executing the model of message traffic using the one or more adjusted real-time messages at inputs.

17. The method of claim 15, wherein the time shifted timestamp for each of the plurality of historical message is a first shifted timestamp, and wherein the method further comprises:
creating a second shifted timestamp for each of the plurality of historical messages;
creating a third shifted timestamp for each of the plurality of historical messages; and
generate the model using one or more of the first shifted timestamp, the second shifted timestamp, and the third shifted timestamp.

18. The method of claim 15, wherein transforming the plurality of time shifted timestamps comprises:
transforming each time shifted timestamp into a corresponding angle by multiplying the time shifted timestamp by $2\pi$;
applying a function of cosine or sine to the angle corresponding to each time shifted time stamp; and
applying a power to results of the function.

19. The method of claim 15, wherein transforming the plurality of time shifted timestamps comprises:
transforming each time shifted timestamp into a corresponding angle by multiplying the time shifted timestamp by $2\pi$;
applying a hyperbolic tangent function to the angle corresponding to each time shifted time stamp; and
applying a power to results of the function.

20. At least one non-transitory computer-readable storage media having computer-executable instructions embodied thereon for authenticating an online user using a message timestamp transformation analysis (MTTA) server communicatively coupled to a destination server, wherein when executed by at least one processor, the computer-executable instructions cause the at least one processor to:
receive, from the destination server, a plurality of historical messages that have been routed through a message routing server between a plurality of sources and the destination server, wherein each message of the plurality of historical messages includes a timestamp;

for each of the plurality of historical messages, time shift the corresponding timestamp by:
- calculating an initial timestamp value as a number of time units that have passed from a beginning of a time scale;
- calculating a total number of time units in the time scale;
- calculating a time shift value based on a base point that is different from the beginning of the time scale; and
- calculating the time shifted timestamp as a difference between the initial timestamp value and the time shift value, divided by the total number of time units in the time scale;

transform the plurality of time shifted timestamps based on a portion of an entire time period completed;

generate a model of message traffic based on the plurality of historical messages with the transformed and time shifted timestamps;

receive one or more real-time messages between a first source and the destination server;

execute the model of message traffic using the one or more real-time messages as inputs; and determine whether or not to prevent the one or more real-time messages from reaching the destination server based on the execution of the model.

* * * * *